United States Patent
Britt et al.

(10) Patent No.: US 10,108,906 B2
(45) Date of Patent: Oct. 23, 2018

(54) AVOIDING SUPPORTING EVIDENCE PROCESSING WHEN EVIDENCE SCORING DOES NOT AFFECT FINAL RANKING OF A CANDIDATE ANSWER

(71) Applicant: International Business Machines Corporation, Armonk, NY (US)

(72) Inventors: Michael W. Britt, Rochester, MN (US); Adam C. Lange-Pearson, Rochester, MN (US); Thomas P. Pitzen, Rochester, MN (US); Richard J. Stevens, Monkton, VT (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 14/576,893

(22) Filed: Dec. 19, 2014

(65) Prior Publication Data

US 2016/0180244 A1    Jun. 23, 2016

(51) Int. Cl.
*G06N 99/00* (2010.01)
*H04L 12/751* (2013.01)

(52) U.S. Cl.
CPC ............ *G06N 99/005* (2013.01); *H04L 45/08* (2013.01)

(58) Field of Classification Search
None
See application file for complete search history.

(56) References Cited

U.S. PATENT DOCUMENTS

| 5,519,608 A * | 5/1996 | Kupiec | G06F 17/3064 |
| | | | 704/9 |
| 8,738,362 B2 | 5/2014 | Ferrucci et al. | |
| 9,317,586 B2 * | 4/2016 | Chu-Carroll | G06F 17/30654 |
| 2010/0293608 A1 * | 11/2010 | Schechter | G06F 17/2785 |
| | | | 726/8 |
| 2012/0078636 A1 * | 3/2012 | Ferrucci | G06F 17/30654 |
| | | | 704/270.1 |
| 2013/0013615 A1 * | 1/2013 | Brown | A61B 5/00 |
| | | | 707/741 |
| 2013/0017524 A1 * | 1/2013 | Barborak | G09B 7/04 |
| | | | 434/322 |
| 2013/0018652 A1 * | 1/2013 | Ferrucci | G06F 17/30507 |
| | | | 704/9 |
| 2013/0029307 A1 | 1/2013 | Ni et al. | |
| 2013/0066886 A1 * | 3/2013 | Bagchi | G06F 17/30654 |
| | | | 707/749 |

(Continued)

OTHER PUBLICATIONS

Ferrucci, David, et al. "Building Watson: An overview of the DeepQA project." AI magazine 31.3 (2010): 59-79.*

(Continued)

*Primary Examiner* — Stanley K. Hill
(74) *Attorney, Agent, or Firm* — Patterson + Sheridan, LLP

(57) ABSTRACT

Systems and computer program products to provide selective supporting evidence processing by applying a first machine learning (ML) model to a first candidate answer to generate a first confidence score that does not consider supporting evidence for the first candidate answer, determining, from a second ML model, an expected contribution of processing supporting evidence for the first candidate answer, and upon determining that the expected contribution does not exceed a specified threshold, skipping supporting evidence processing for the first candidate answer.

18 Claims, 5 Drawing Sheets

(56) References Cited

U.S. PATENT DOCUMENTS

| | | | |
|---|---|---|---|
| 2013/0132308 A1* | 5/2013 | Boss | G06F 17/30976 706/12 |
| 2013/0138597 A1* | 5/2013 | Kyle | G06N 5/02 706/48 |
| 2014/0006012 A1* | 1/2014 | Zhou | G06F 17/30654 704/9 |
| 2014/0046889 A1* | 2/2014 | Biem | G06F 19/345 706/46 |
| 2014/0172756 A1* | 6/2014 | Clark | G06F 17/00 706/12 |
| 2014/0172880 A1* | 6/2014 | Clark | G06F 17/3053 707/748 |
| 2014/0172883 A1* | 6/2014 | Clark | G06F 17/30038 707/749 |
| 2014/0316768 A1 | 10/2014 | Khandekar | |
| 2015/0074095 A1* | 3/2015 | Enders | G06F 17/27 707/725 |
| 2016/0180217 A1* | 6/2016 | Boston | G06F 17/30554 706/46 |

OTHER PUBLICATIONS

D. C. Gondek et al., "A framework for merging and ranking of answers in DeepQA," in IBM Journal of Research and Development, vol. 56, No. 3.4, pp. 14:1-14:12, May-Jun. 2012.*

A. Kalyanpur et al., "Structured data and inference in DeepQA," in IBM Journal of Research and Development, vol. 56, No. 3.4, pp. 10:1-10:14, May-Jun. 2012.*

Bosnic, Zoran et al.; "An Overview of Advances in Reliability Estimation of Individual Predictions in Machine Learning"; 2008; pp. 1-24. (Year: 2008).*

IBM "List of IBM Patents or Patent Applications Treated as Related".

Britt et al., "Avoiding Supporting Evidence Processing When Evidence Scoring Does Not Affect Final Ranking of a Candidate Answer", U.S. Appl. No. 14/860,809, filed Sep. 22, 2015.

* cited by examiner

AVOIDING SUPPORTING EVIDENCE PROCESSING WHEN EVIDENCE SCORING DOES NOT AFFECT FINAL RANKING OF A CANDIDATE ANSWER

BACKGROUND

The present invention relates to deep question answering systems, and more specifically, to deep question answering systems which do not process supporting evidence when the supporting evidence scoring does not affect the final ranking of a candidate answer.

Deep QA systems typically generate a large set of candidate answers and then search and process a large set of content to serve as supporting evidence for each candidate answer. Currently, deep question answering systems (deep QA systems) incur a large percentage of processing overhead while searching and processing articles used as supporting evidence for candidate answers. The supporting evidence may include, for example, any information in a corpus of information, such as articles, studies, research papers, and the like. The overall performance of the deep QA system can be improved by optimizing the supporting evidence processing phase.

SUMMARY

Embodiments disclosed herein include systems and computer program products to provide selective supporting evidence processing by applying a first machine learning (ML) model to a first candidate answer to generate a first confidence score that does not consider supporting evidence for the first candidate answer, determining, from a second ML model, an expected contribution of processing supporting evidence for the first candidate answer, and upon determining that the expected contribution does not exceed a specified threshold, skipping supporting evidence processing for the first candidate answer.

DETAILED DESCRIPTION

Figure 1:
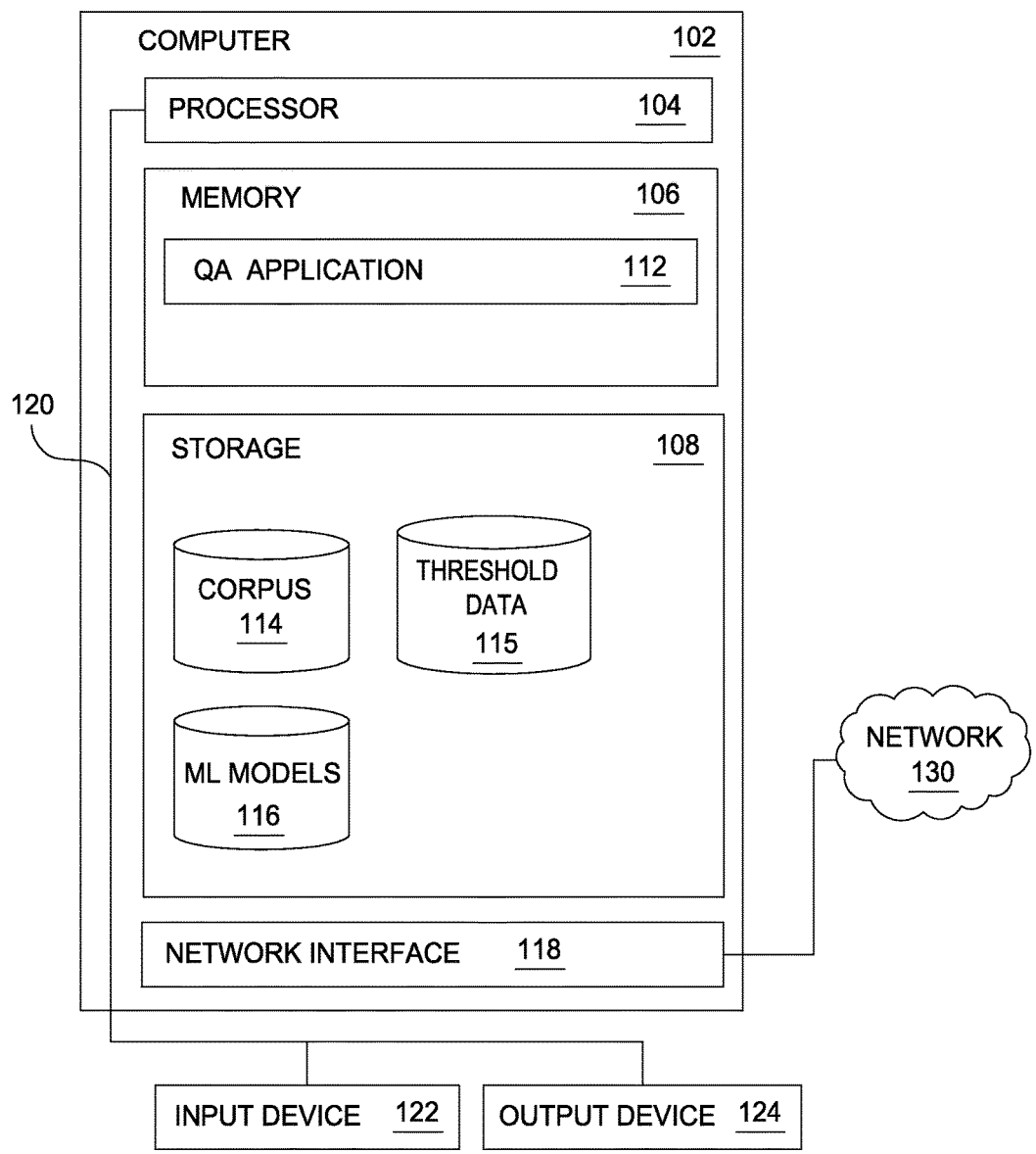
FIG. 1 illustrates a system which provides a deep question answering system that selectively processes supporting evidence, according to one embodiment.

Deep QA systems typically retrieve and process supporting evidence (such as articles, research studies, encyclopedias and the like) for each of a plurality of candidate answers generated as responsive to a case (also referred to as a question). The deep QA systems may return the supporting evidence along with the candidate answer as part of a response to the case. Embodiments disclosed herein provide deep question answering systems (deep QA systems) which conditionally process supporting evidence for certain candidate answers. More specifically, embodiments disclosed herein may skip supporting evidence processing in cases where doing so would not affect the final ranking of a given candidate answer. That is, during a training phase, two machine learning (ML) models may be produced for the deep QA system. The first ML model may produce a confidence score for a candidate answer without considering supporting evidence for the candidate answer. The second ML model may produce a confidence score for the candidate answer considering supporting evidence.

After the training phase, when the deep QA system receives a case (also referred to as a question) from a user, the deep QA system may begin processing the case according to a runtime processing pipeline. However, prior to processing supporting evidence for the candidate answers generated by the processing pipeline, the deep QA system may evaluate the candidate answers using the first ML model to determine a distribution of confidence scores for each candidate answer in the absence of supporting evidence. The deep QA system may then evaluate the candidate answers using the second ML model. Application of an ML model generally aggregates multiple feature scores into an overall answer confidence score by applying weights defined by the model reflecting how frequently each feature predicts desirable answers based on a training set of data. Therefore, the QA application 112 may reference the weighting coefficients stored in the second ML model to determine whether features produced by supporting evidence processing would result in a significant enough increase or decrease in the overall candidate answer score (or rank) to be worth incurring supporting evidence processing for the candidate answer. The weighting coefficients stored in the second ML model may reflect a weighted contribution that supporting evidence processing provides to the final ranking of a candidate answer. If the product of the weighted coefficient, as applied to the range of supporting evidence feature scores exceeds a threshold, the deep QA system processes supporting evidence for the candidate answer. That is, the score indicates whether supporting evidence is likely to have a meaningful impact on the final ranking (or overall candidate answer score) of the candidate answer. If, however, the product of the weighted coefficient and the range of feature scores does not exceed the threshold for a candidate answer, the deep QA system may skip processing supporting evidence for that candidate answer, as doing so is unlikely to change the final ranking (or overall score) of the candidate answer.

FIG. 1 illustrates a system 100 which provides a deep question answering system that selectively processes supporting evidence, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries.

Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the storage 108 includes a corpus 114, a threshold data 115, and a machine learning (ML) models 116. The corpus 114 is a body of information used by the QA application 112 to generate and evaluate answers to questions (also referred to as cases). For example, the corpus 114 may contain scholarly articles, dictionary definitions, encyclopedia references, product descriptions, web pages, and the like. The threshold data 115 includes a plurality of thresholds applied by the QA application 112 while processing a case. For example, the threshold data 115 may specify ranges of confidence scores for candidate answers corresponding to tiers of "high," "medium," and "low" confidence. For example, confidence scores of 0.0-0.33 may be in a "low" confidence level, while confidence scores of 0.34-0.66 may be in the "medium" confidence level, and confidence scores of 0.67-1.0 may be in a "high" confidence level. The machine learning (ML) models 116 are models created by the QA application 112 during a training phase, which are used during an execution pipeline to score and rank candidate answers to cases based on features previously generated for each answer. The ML models 116 include machine learning models that reflect coefficients assigned to supporting evidence features (such as the second ML model described herein) as well as models that do not reflect supporting evidence feature coefficients (such as the first ML model described herein). Therefore, as indicated, the second ML model includes weighting coefficients of supporting evidence features generated during a training phase of the QA application 112.

As shown, the memory 106 contains a QA application 112, which is an application generally configured to provide a deep question answering (QA) system. One example of a deep question answering system is Watson, by the IBM Corporation of Armonk, N.Y. A user may submit a case (also referred to as a question) to the QA application 112. The QA application 112 will then provide an answer to the case based on an analysis of a corpus of information 114. Although depicted as executing on a single computer, the functionality of the QA application 112 may be provided by grid or cluster of computers (not pictured), and the QA application 112 may serve as a frontend to orchestrate such distributed functionality.

The QA application 112 is trained to generate responses to cases during a training phase. During the training phase, the QA application 112 is trained to answer cases using an "answer key" which predefines the most correct responses. During training, the QA application 112 ingests content in the corpus 114 to produce one or more machine learning models (not pictured). In addition, during the training phase, the QA application 112 is configured to identify data attributes which are important to answering cases (namely, those attributes having an impact on the confidence score of a given answer).

After being trained, the QA application 112 may process user cases through a runtime analysis pipeline. In at least one embodiment, the case data 213 include medical records of a patient, and the candidate answers returned by the QA application 112 correspond to a set of recommended treatments, ranked by a confidence score of each respective candidate answer. The analysis pipeline executes a collection of analysis programs to evaluate both the question text and candidate answers (i.e., text passages extracted from documents in a corpus 114) in order to construct the most probable correct answer, based on the information extracted from the corpus and from the question. A typical execution pipeline may begin with question analysis, which analyzes and annotates each question presented in the case to identify key topics, concepts, and attributes for conducting a search. The next step of the pipeline may include a primary search, which involves searching for documents in the corpus 114 using the key attributes from the question analysis phase. The next step of the pipeline may identify candidate answers. For example, the QA application 112 may identify key matching passages (based on, for example, topics, concepts, and/or string matching) from the search results with passages in the candidate answers. The QA application 112 may then score each candidate answer. In the next step of the pipeline, the QA application 112 may then retrieve supporting evidence for the candidate answers. The QA application 112 may then complete the pipeline by scoring the various candidate answers considering supporting evidence (if such supporting evidence was processed for the candidate answer, as described herein), from which the most correct answer identified by the QA application 112 may returned to the user.

The QA application 112 may further be configured to skip supporting evidence processing for some candidate answers. Generally, the QA application 112 may skip supporting evidence processing in cases where doing so is predicted to not impact the final ranking of a candidate answer. During a training phase of the QA application 112, two machine learning (ML) models may be produced and stored in the ML models 116. The first ML model produces a confidence score for a candidate answer without considering supporting evidence for the candidate answer. The second ML model produces a confidence score for the candidate answer that considers supporting evidence.

When the QA application 112 subsequently receives a case from the user, the QA application 112 may begin processing the case according to the execution pipeline described above. However, after the candidate answer scoring phase and prior to processing supporting evidence, the QA application 112 may determine whether to proceed with the supporting evidence processing phase. Specifically, the QA application 112 may apply the first ML model to the candidate answers generated in the candidate answer generation phase. The first ML model may generate a confidence score for each candidate answer, reflecting a level of confidence that the candidate answer is correct. In many cases, the confidence scores for each candidate answer may vary, leaving gaps between the confidence scores of candidate answers, as well as gaps between the confidence score of a given candidate answer and a next threshold in the threshold data 115 (such as a threshold for an answer having a "high" level of confidence, versus the "medium" level of confidence corresponding to the score generated by the first ML model). In one embodiment, the QA application 112 skips supporting evidence processing for candidate answers where processing the supporting evidence would not change the final rankings (e.g., either allowing one candidate answer to overtake a higher ranked candidate answer, or allowing the candidate answer to move to a higher confidence tier). Stated differently, if the coefficients in the second model predict that supporting evidence processing would not eliminate the gap between a first, lower ranked candidate answer and a second, higher ranked candidate answer, then the QA application 112 may skip supporting evidence processing. As another example, if the first ML model assigns a candidate answer a confidence score corresponding to a "medium" tier of confidence, and processing the supporting evidence would not place the candidate answer in a "high" tier of confidence, the QA application 112 may skip supporting evidence processing for that candidate answer.

In one embodiment, the QA application 112 may reference the second ML model to predict what impact supporting evidence processing will have on a final ranking of a candidate answer. For example, the second ML model specifies a weighting coefficient reflecting how much supporting evidence processing may change the confidence score for the candidate answer. The second ML model may also include a distribution of supporting evidence feature scores reflecting the range of possible supporting evidence feature scores (namely the supporting evidence feature scores observed during training the QA application 112). Generally, the QA application 112 may consider the weighting coefficient and the distribution of supporting evidence feature scores to determine whether the contribution of supporting evidence processing would be sufficient to change a final ranking of a candidate answer (relative to others).

For example, the QA application 112 may compute a product of a typical supporting evidence feature score and the weighting coefficient. The typical supporting evidence feature score may be selected (or computed) from the range of supporting evidence feature scores in the second ML model. If the product is greater than the gap between confidence scores of neighboring candidate answers or the gap between the confidence score of a candidate answer and a higher or lower answer tier threshold, the QA application 112 may process supporting evidence for the candidate answer, as the supporting evidence may affect the final ordering of candidate answers, or may place a given candidate answer in a different tier of candidate answers. However, if the product of the weighting coefficient and the typical feature score is less than the gap between answers, or will not affect the candidate answer's final tier, the QA application 112 may forego supporting evidence processing. Table I depicts a set of examples, as follows.

TABLE I

| Candidate Answer | Score generated by applying first ML Model | Gap to nearest candidate answer | Typical feature score and weighting coefficient | Product of feature score and weighting coefficient | Process supporting evidence? |
|---|---|---|---|---|---|
| 1 | .80 | .05 | .50, .2 | .1 | Yes |
| 2 | .75 | .05 | .80, .10 | .08 | Yes |
| 3 | .55 | .20 | .55, .01 | .055 | No |
| 4 | .31 | .14 | .50, .5 | .25 | No |

Generally, Table I depicts four example candidate answers 1-4 and whether the QA application 112 determines to proceed with supporting evidence for each candidate answer. In at least one embodiment, the QA application 112 may store the data which populates Table I in the storage 108. As shown, the QA application 112 has generated a confidence score for each candidate answer by applying the first ML model to each candidate answer. As shown, the first ML model generated confidence scores of 0.80, 0.75, 0.55, and 0.31 for candidate answers 1-4, respectively. The confidence scores reflected in Table I may be within a range of confidence scores ranging from 0.0 to 1.0 (from least confidence to greatest confidence). The third column of Table I depicts a "gap" between the confidence scores of the current candidate answer and the nearest candidate answer (although the "gap" may also reflect the gap between the confidence score of the current candidate answer and answer tier threshold). Therefore, the gaps for candidate answers 1 and 2 are listed at 0.05, as the difference between their respective confidence scores is 0.8−0.75=0.05.

In addition, Table I depicts the results of applying the second ML model to each candidate answer 1-4. Specifically, Table I reflects a typical feature score and a weighting coefficient generated specified in the second ML model. The typical feature score may reflect feature scores calculated for supporting evidence by the QA application 112. In one embodiment, the typical feature score represents the maximum feature score observed during training of the QA application 112. In another embodiment, the typical feature score reflects a feature score value that is greater than some large percentage of cases used for training (e.g., an evidence feature score that is higher than 70% of the evidence feature scores produced during training of the QA application 112). In another embodiment, the typical feature score is an average feature score of a range of feature scores specified in the second ML model. As shown, the second ML model specifies a typical evidence feature score of 0.5, 0.8, 0.55, and 0.50 for candidate answers 1-4, respectively. In addition, the second ML model specifies a weighting coefficient of 0.2, 0.1, 0.01, and 0.5 for candidate answers 1-4, respectively.

The QA application 112 may leverage the first and second ML models to determine whether to process supporting evidence for each candidate answer. As noted, the QA application 112 may compute a product of the weighting coefficient and the typical feature score specified by the second ML model, reflected in the fifth column of Table I. If the product is greater than the gap between confidence scores of different candidate answers, the QA application 112 determines that processing supporting evidence changes a final ranking of the candidate answers and processes the supporting evidence. For example, the product of the typical feature score and weighting coefficient of candidate answer 2 is 0.08 (based on a typical feature score of 0.8 and a coefficient of 0.1). However, the difference between the confidence scores generated by the first ML model for candidate answers 1 and 2 is 0.05. Because the product for candidate answer 2 is 0.08 (which is greater than 0.05), processing supporting evidence changing the ranking of candidate answers 1 and 2 in the final rankings (0.75+ 0.08=0.83, which is greater than 0.80). Therefore, as shown, the QA application 112 processes supporting evidence for candidate answer 2.

Similarly, the QA application 112 would process supporting evidence for candidate answer 1. As shown, the supporting evidence may negatively affect the final score for candidate answer 1, as the typical feature score specified in the second ML model is 0.5, and the weighting coefficient is 0.2, for a product of 0.1. Because processing supporting evidence for candidate answer 1 may reduce the final confidence score for candidate answer 1 to fall below that of candidate answer 2 (i.e., the score may fall to 0.7 by subtracting 0.1 from 0.8), the QA application 112 may process the supporting evidence for candidate answer 1. Stated differently, the QA application 112 may process supporting evidence for candidate answer 1 because the product of 0.1 (which may be negative, considering the typical feature score specified in the second ML model) for candidate answer 1 is greater than the 0.05 difference between the confidence scores of 0.8 and 0.75 generated for candidate answers 1 and 2 by the first ML model. Similarly, assuming that a threshold confidence score between "medium" and "high" confidence results in the thresholds 115 is 0.71, the confidence level for candidate answer 1 may go from "high" (corresponding to the confidence score of 0.8 produced by the first ML model) to "medium" (corresponding to the confidence score of 0.7 when considering supporting evidence). Because candidate answer 1 may move from the high tier to the medium tier, the QA application 112 may process supporting evidence for candidate answer 1. When considering confidence tiers, the "gap" listed for candidate answer 1 in Table 1 would be 0.09, which is the difference between the confidence score of 0.8 produced by the first ML model for candidate answer 1 and the nearest tier of 0.71 (0.8−0.09=0.71).

As shown in Table I, however, the QA application 112 may determine to forego supporting evidence processing for candidate answers 3 and 4. The QA application 112 may forego supporting evidence processing for candidate answer 4 because the confidence score generated by applying the first ML model is below a minimum threshold in the thresholds 115. For example, if the minimum threshold is 0.4, then the QA application 112 may not process supporting evidence for candidate answer 4, which has a confidence score of 0.31 generated by the first ML model. The minimum threshold may cause the QA application 112 to forego supporting evidence processing for candidate answer 4 even though the expected contribution of supporting evidence processing (0.25) may cause candidate answer 4 to overtake candidate answer 3 in the final rankings (0.56 versus 0.55). Stated differently, in at least one embodiment, the QA application 112 will forego supporting evidence processing for candidate answers having a low confidence score produced by the first ML model.

The QA application 112 may forego supporting evidence processing for candidate answer 3 for a number of reasons. For example, the QA application 112 could determine that the contribution of supporting evidence processing (0.0055) is insufficient to rank candidate answer 3 above candidate answers 1 or 2, or is insufficient to rank candidate answer 3 below candidate answer 4. Alternatively, the QA application 112 may determine that the contribution of supporting evidence processing (0.0055) would not reassign candidate answer 4 to a different tier of answer classes. For example, if the final confidence score for candidate answer 3 considering supporting evidence is 0.5555 (0.55+0.0055), and the threshold between medium and high confidence tiers is 0.71, as described above, and the threshold between low and medium confidence tiers is 0.4, the supporting evidence would not reassign candidate answer 3 to another tier of candidate answers. Stated differently, candidate answer 3 will remain in the "medium" tier of candidate answers regardless of whether supporting evidence is processed. In cases such as this, the QA application 112 skips processing supporting evidence.

Figure 2:
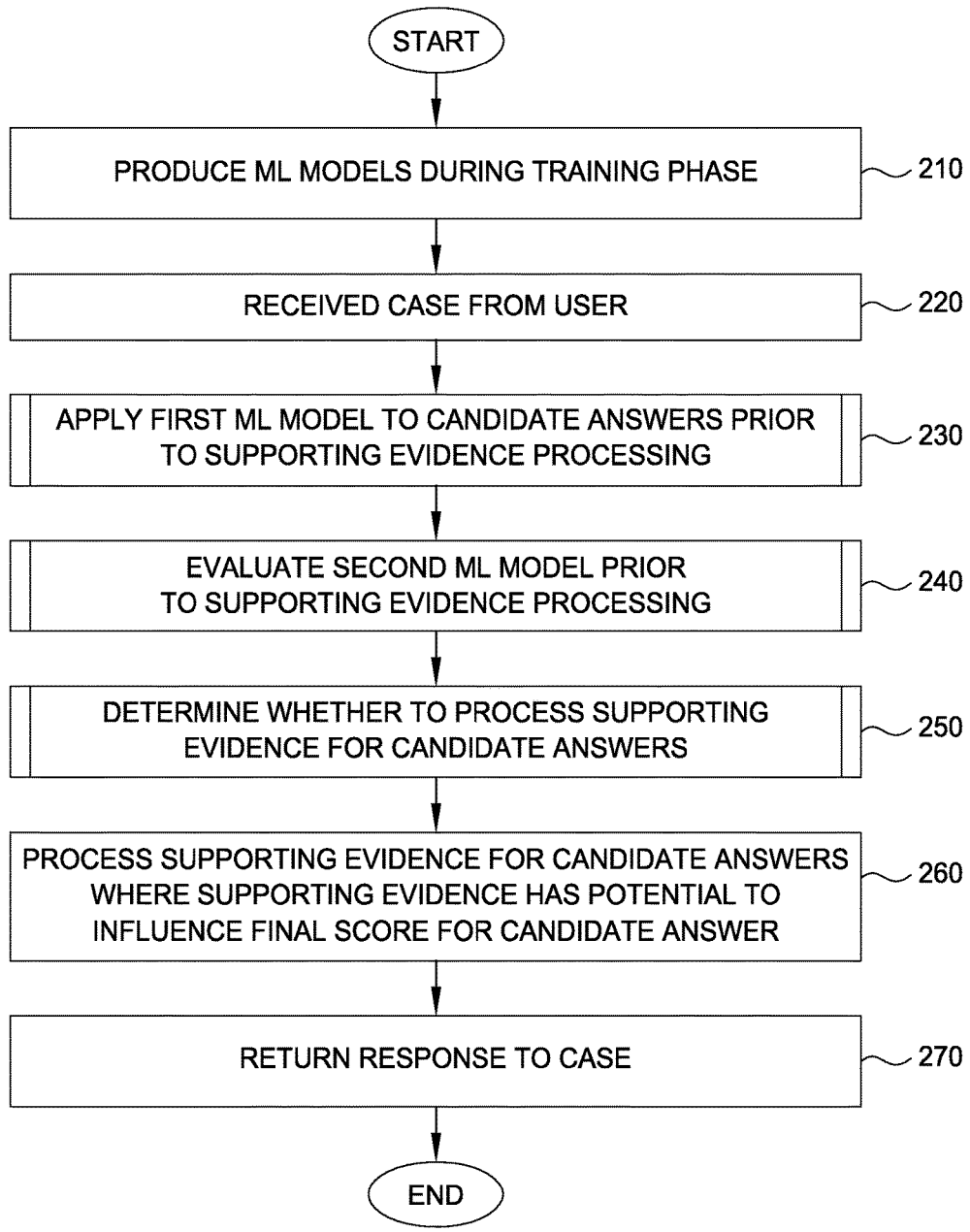
FIG. 2 illustrates a method to selectively process supporting evidence, according to one embodiment.

FIG. 2 illustrates a method 200 to selectively process supporting evidence, according to one embodiment. The method 200 begins at step 210, where a set of machine learning (ML) models are produced during a training phase of the QA application 112. Generally, the training phase involves running a number of training cases through the execution pipeline of the QA application 112 using an answer key, so that the QA application 112 can "learn" how to best predict correct answers for future cases. The result of the training phase is one or more ML models which are stored in the ML models 116 and subsequently applied to a runtime pipeline that the QA application 112 uses to answer new cases (questions) received from users. In one embodiment, the ML models generated in the training phase include a first ML model that does not consider supporting evidence for candidate answers, and a second ML model that considers supporting evidence. The first ML model may compute a confidence score for candidate answers that does not consider supporting evidence. The second ML model may compute a weighting coefficient for the supporting evidence as well as a distribution of confidence scores generated for the candidate answers. The first and second ML models may be stored in the ML models 116.

At step 220, the QA application 112 may receive a case from a user. In response, the QA application 112 begins processing the case through the execution pipeline described above. The QA application 112 may generally perform the question analysis, candidate answer generation, and candidate answer scoring phases at step 220. However at step 230, prior to processing supporting evidence for the candidate answers (and prior to the final answer scoring phase), the QA application 112 may apply the first ML model in the ML models 116 to the candidate answers generated by the QA application 112. Generally, at step 230, the QA application 112 may apply the first ML model to the candidate answers to produce a confidence score for each candidate answer. As noted, the first ML model computes a confidence score for each candidate answer. At step 240, again prior to processing supporting evidence for the candidate answers, the QA application 112 may evaluate the second ML model in the ML models 116 against the previously generated candidate answers. Generally, at step 240, the QA application 112 interrogates (or references) the second ML model to determine the specified weighting coefficient for the supporting evidence as well as a distribution of supporting evidence feature scores for the candidate answers.

At step 250, the QA application 112 may determine whether to process supporting evidence for each candidate answer. At step 260, the QA application 112 may process supporting evidence for candidate answers where processing supporting evidence has the potential to influence the final score (or ranking, or tier) of the respective candidate answer. Conversely, the QA application 112 may determine to forego supporting evidence processing where supporting evidence processing would have no impact on the final score, ranking, or tier of the candidate answer. At step 270, the QA application 112 may return a response to the case. If the QA application 112 skips supporting evidence processing for one or more candidate answers, results for a given question (i.e., an answer generated by the QA application 112) may indicate which candidate answers had supporting evidence processed by the supporting evidence processing component of the pipeline. The indication may include a reason why supporting evidence was not processed (for example, because the final ranking or the final tier of the candidate answer was unlikely to change as a result of supporting evidence processing).

Figure 3:
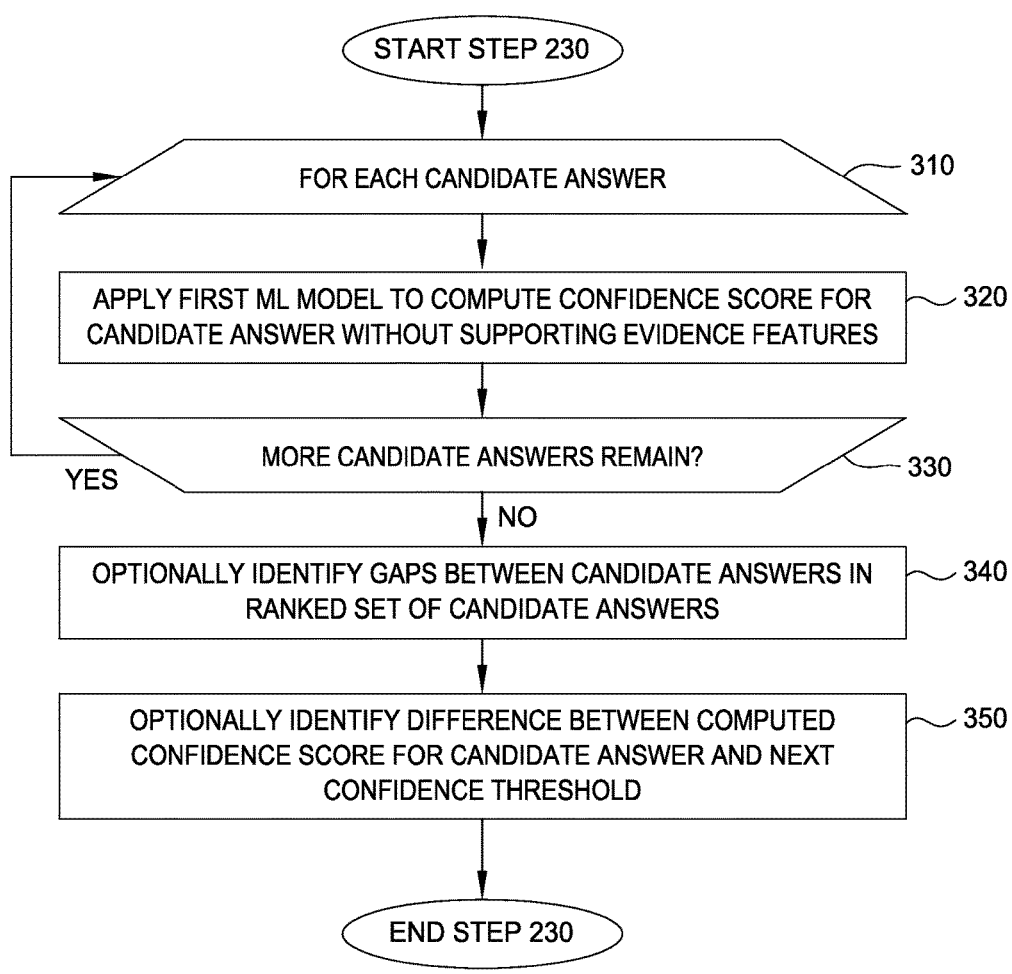
FIG. 3 illustrates a method to apply a first machine learning model to candidate answers prior to supporting evidence processing, according to one embodiment.

FIG. 3 illustrates a method 300 for evaluating candidate answers using a first machine learning model, according to one embodiment. The method 300 begins at step 310, where the QA application 112 may execute a loop including step 320 for each candidate answer. At step 320, first ML model determines a confidence score for a current candidate answer. As noted, the first ML model predicts a confidence score (or range of scores or tier) that would be assigned by the pipeline to the current candidate answer, if processed without any supporting evidence. At step 330, the QA application 112 determines whether more candidate answers remain. If so, the QA application 112 processes the next candidate answer. Once the first ML model predicts a score for each candidate answer, the QA application 112 may then rank each candidate answer according to predicted confidence scores. Table I reflects example of such a ranking of confidence scores.

At step 340, the QA application 112 may identify any gaps between candidate answers in the ranked set of candidate answers. For example, if a first candidate answer has a confidence score of 0.77 and a second candidate answer has a confidence score of 0.66, the gap between these candidate answers is 0.11. Based on these scores, if the second ML model indicates processing supporting evidence for the first or second candidate (or both) would not change the difference between these scores by more than 0.11, the QA application 112 can skip supporting evidence processing for these candidate answers, as the final ranking is unlikely to changed by supporting evidence. At step 350, the QA application 112 may computes a difference between the confidence score computed at step 310 for each candidate answer and the next confidence threshold. For example, if the threshold between "medium" and "high" confidence responses is 0.67, and the first ML model computed a confidence score of 0.6 for a candidate answer, the difference would be 0.07. If applying the second ML model indicates that processing supporting evidence would not increase the score by more than 0.07, the QA application 112 skips supporting evidence processing for this candidate answer.

Figure 4:
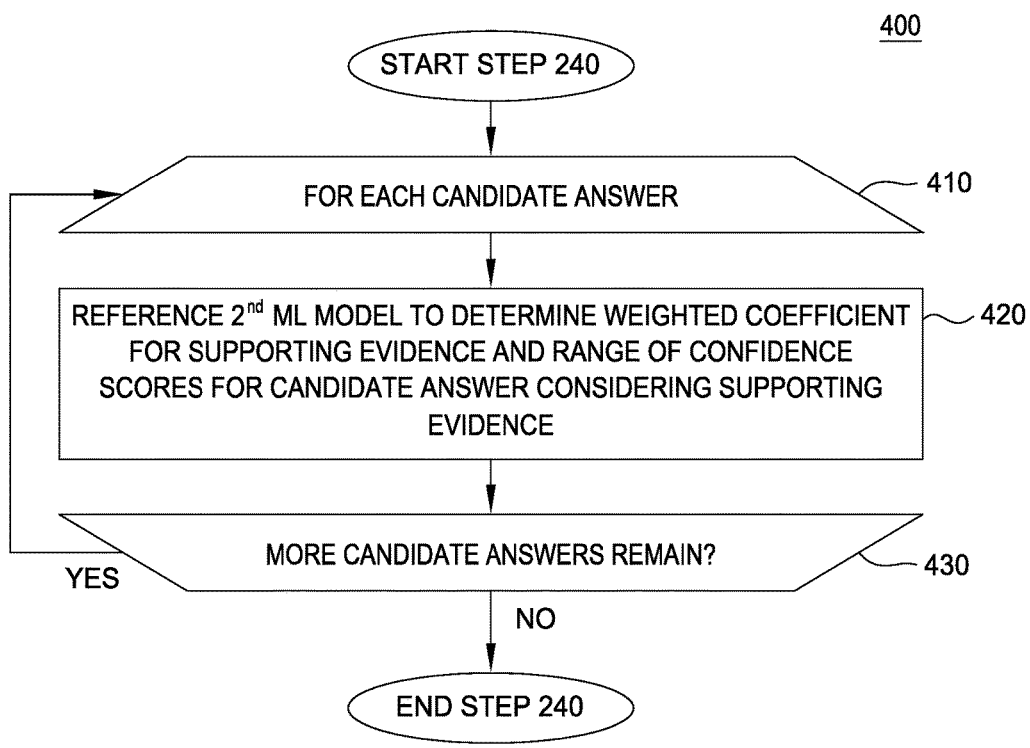
FIG. 4 illustrates a method to apply a second machine learning model to candidate answers prior to supporting evidence processing, according to one embodiment.

FIG. 4 illustrates a method 400 to evaluate candidate answers using a second ML model prior to supporting evidence processing, according to one embodiment. As shown, the method 400 begins at step 410, where the QA application 112 executes a loop including step 420 for each candidate answer. At step 420, the QA application 112 may reference the second ML model. The QA application 112 may reference the second ML model to determine a weighted coefficient of the supporting evidence for the candidate answer. Furthermore, the second ML model specifies a possible range of supporting evidence feature scores produced during training the QA application 112. At step 430, the QA application 112 may determine whether more candidate answers remain. If more candidate answers remain, the QA application 112 returns to step 410. If no more candidate answers remain the method 400 ends.

Figure 5:
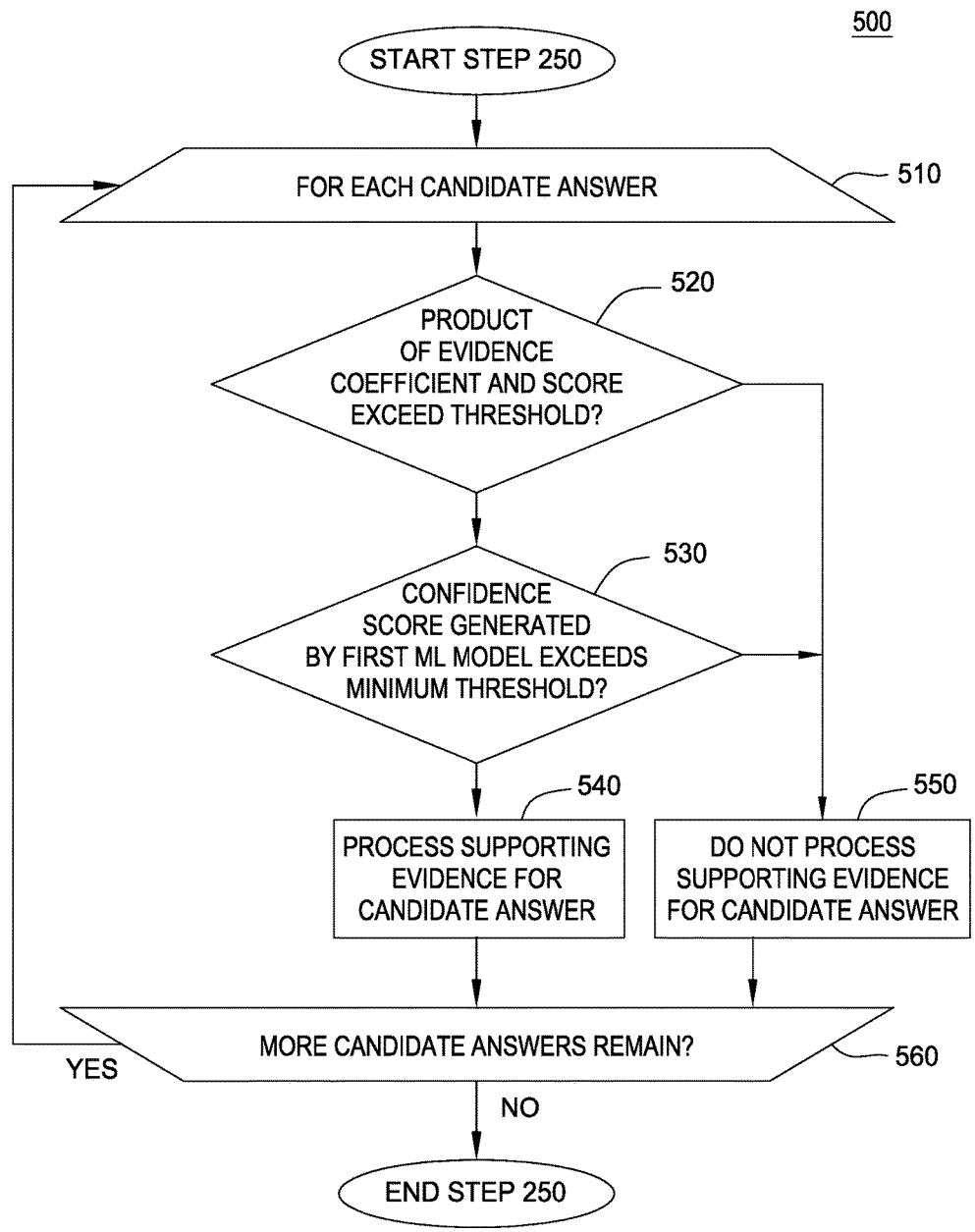
FIG. 5 illustrates a method to determine whether to process supporting evidence for candidate answers, according to one embodiment.

FIG. 5 illustrates a method 500 for selectively determining whether to process supporting evidence for candidate answers, according to one embodiment. As shown, the method 500 begins at step 510, where the QA application 112 executes a loop including steps 520-550 for each candidate answer. At step 520, the QA application 112 may determine whether the product of the weighting coefficient for supporting evidence and a predefined supporting evidence feature score (such as the typical supporting evidence feature score, described above) specified in the second ML model at step 420 exceeds a predefined threshold. As previously indicated, the threshold may be an amount required to move the candidate answer to a different level of candidate answer (such as "medium" to "high," and vice versa). The threshold may also correspond to a gap between the confidence score of the current candidate answer and neighboring candidate answers. For example, if the first ML model produced a confidence score of 0.85 for the current candidate answer and a confidence score of 0.90 for a second candidate answer, the threshold (or gap) would be 0.05. If the product exceeds the threshold, the QA application 112 may proceed to step 530. If the product does not exceed the threshold, the QA application 112 may proceed to step 550, as the QA application 112 may determine that processing supporting evidence may not have an impact on the final score, ranking, or tier of the candidate answer.

At step 530, the QA application 112 may determine whether the confidence score generated by the first ML model for the current candidate answer exceeds a minimum threshold in the thresholds 115. For example, if the first ML model computed a confidence score of 0.20 for the current candidate answer, and the minimum threshold is 0.30, the QA application 112 may forego supporting evidence processing for the candidate answer, as it is unlikely to become a candidate answer of relevance even when considering supporting evidence. If the confidence score exceeds the minimum threshold, the QA application 112 may proceed to step 540. If the confidence score does not exceed the minimum threshold, the QA application 112 may proceed to step 550.

At step 540, the QA application 112 may determine to process supporting evidence for the current candidate answer. In determining to process supporting evidence for the candidate answer, the QA application 112 has determined that processing supporting evidence has the potential to influence the final confidence score, ranking, and/or tier of the candidate answer. At step 550, the QA application 112 may determine to not process supporting evidence for the candidate answer. Generally, at step 550, the QA application 112 foregoes supporting evidence processing where processing the supporting evidence would have little to no impact on the final confidence score, ranking, and/or tier of the candidate answer. Avoiding supporting evidence processing allows the QA application 112 to improve overall pipeline performance, throughput, and response times. At step 560, the QA application 112 may determine whether more candidate answers remain. If more candidate answers remain, the QA application 112 returns to step 510. If no more candidate answers remain the method 500 ends.

Advantageously, embodiments disclosed herein provide deep question answering systems which conditionally process supporting evidence for candidate answers. Generally, the deep question answering systems described herein process supporting evidence when doing so would influence the final scores, rankings, and/or tiers of each candidate answer.

Avoiding supporting evidence processing where little to no influence on these factors would be observed allows the deep question answering systems recited herein to improve overall pipeline performance, throughput, and response times.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the QA application 112 could execute on a computing system in the cloud and produce machine learning models that consider supporting evidence as well as machine learning models that do not consider supporting evidence for a candidate answer. In such a case, the QA application 112 could store the generated machine learning models at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
one or more computer processors; and
a memory containing a program, which when executed by the one or more computer processors, performs an operation to provide selective supporting evidence processing in a question answering (QA) system, the operation comprising:
initiating processing of a first question using an execution pipeline of the QA system, wherein the execution pipeline comprises (i) a first stage configured to determine candidate answers to the first question without consideration of any items of supporting evidence and (ii) a second stage, downstream from the first stage, configured to process items of supporting evidence relating to the candidate answers in order to generate updated confidence scores;
upon determining a first candidate answer for a first question during the first stage of the execution pipeline and prior to executing the second stage of the execution pipeline:
generating, by the QA system, using a first machine learning (ML) model, a first confidence score value for the first candidate answer, wherein the first confidence score value reflects a degree to which the first candidate answer is a correct response to the first question, wherein the first ML model does not consider supporting evidence features for the first candidate answer;
generating, by the QA system, using a second ML model, a measure of expected change to the first confidence score value based at least in part on supporting evidence features for the first candidate answer; and
upon determining that the measure of expected change does not exceed a first threshold, returning, by the QA system, at least the first candidate answer in response to the first question, without processing the first question using the second stage of the execution pipeline.

2. The system of claim 1, wherein the second ML model specifies: (i) a weighted coefficient value for processing items of supporting evidence for the first candidate answer, and (ii) a plurality of supporting evidence feature score values, wherein each supporting evidence feature score value of the plurality of supporting evidence feature score values was observed during a training session of the QA system by processing items of supporting evidence for each of a plurality of candidate answers generated during the training session.

3. The system of claim 2, wherein the measure of expected change to the first confidence score value is generated by computing a product of the weighted coefficient value and one of: (i) an average of the plurality of supporting evidence feature score values in the second (ML) model, (ii) a maximum value of the plurality of supporting evidence feature score values, and (iii) a selected one of the plurality of supporting evidence feature score values that is greater than a threshold percentage of the plurality of supporting evidence feature score values.

4. The system of claim 3, wherein the plurality of threshold comprises at least one of: (i) a difference between the confidence score value of a second candidate answer and the first confidence score value of the first candidate answer, wherein the confidence score value of the second candidate answer is generated by applying the first ML model to the second candidate answer, (ii) a difference between a confidence score threshold for a first confidence tier of a plurality of confidence tiers and the first confidence score value, and (iii) a difference between the first confidence score value and a minimum confidence score value, wherein the minimum confidence score value is associated with a minimum confidence tier of the plurality of confidence tiers.

5. The system of claim 1, the operation further comprising:
generating, by the QA system, using the first machine learning (ML) model, a second confidence score value for a second candidate answer;
generating, by the QA system, using the second ML model, a second measure of expected change to the first confidence score value based at least in part on supporting evidence features for the second candidate answer;
determining that the measure of expected change exceeds a second threshold;
processing items of supporting evidence for the second candidate answer;
scoring the second candidate answer; and
ranking the second candidate answer relative to a set of other candidate answers based on a respective score for each candidate answer.

6. The system of claim 5, the operation further comprising:
prior to processing items of supporting evidence for the second candidate answer, determining that the second confidence score value exceeds a minimum confidence threshold.

7. The system of claim 1, the operation further comprising:
generating, by the QA system, the first and second ML models during a training session of the QA system.

8. A computer program product to provide selective supporting evidence processing in a question answering (QA) system, comprising:
a non-transitory computer-readable storage medium having computer-readable program code embodied therewith, the computer-readable program code executable by one or more computer processors to perform an operation comprising:
initiating processing of a first question using an execution pipeline of the QA system, wherein the execution pipeline comprises (i) a first stage configured to determine candidate answers to the first question without consideration of any items of supporting evidence and (ii) a second stage, downstream from the first stage, configured to process items of supporting evidence relating to the candidate answers in order to generate updated confidence scores;
upon determining a first candidate answer for a first question during the first stage of the execution pipeline and prior to executing the second stage of the execution pipeline:
generating, by the QA system, using a first machine learning (ML) model, a first confidence score value for the first candidate answer, wherein the first confidence score value reflects a degree to which the first candidate answer is a correct response to the first question, wherein the first ML model does not consider supporting evidence features for the first candidate answer;
generating, by the QA system, using a second ML model, a measure of expected change to the first confidence score value based at least in part on supporting evidence features for the first candidate answer; and
upon determining that the measure of expected change does not exceed a first threshold, returning, by the QA system, at least the first candidate answer in response to the first question, without processing the first question using the second stage of the execution pipeline.

9. The computer program product of claim 8, wherein the second ML model specifies: (i) a weighted coefficient value for processing items of supporting evidence for the first candidate answer, and (ii) a plurality of supporting evidence feature score values, wherein each supporting evidence feature score value of the plurality of supporting evidence feature score values was observed during a training session of the QA system by processing items of supporting evidence for each of a plurality of candidate answers generated during the training session.

10. The computer program product of claim 9, wherein the measure of expected change is generated by computing a product of the weighted coefficient value and one of: (i) an average of the plurality of supporting evidence feature score values in the second ML model, (ii) a maximum value of the plurality of supporting evidence feature score values, and (iii) a selected one of the plurality of supporting evidence feature score values that is greater than a threshold percentage of the plurality of supporting evidence feature score values.

11. The computer program product of claim 10, wherein the first threshold comprises at least one of: (i) a difference between the confidence score value of a second candidate answer and the first confidence score value of the first candidate answer, wherein the confidence score value of the second candidate answer is generated by applying the first ML model to the second candidate answer, (ii) a difference between a confidence score threshold for a first confidence tier of a plurality of confidence tiers and the first confidence score value, and (iii) a difference between the first confidence score value and a minimum confidence score value, wherein the minimum confidence score value is associated with a minimum confidence tier of the plurality of confidence tiers.

12. The computer program product of claim 9, the operation further comprising:
generating, by the QA system, using the first machine learning (ML) model, a second confidence score value for a second candidate answer;
generating, by the QA system, using the second ML model, a second measure of expected change to the first confidence score value based at least in part on supporting evidence features for the second candidate answer;
determining that the measure of expected change exceeds a second threshold;
processing items of supporting evidence for the second candidate answer;
scoring the second candidate answer; and ranking the second candidate answer relative to a set of other candidate answers based on a respective score for each candidate answer.

13. The computer program product of claim 12, the operation further comprising: generating, by the QA system, the first and second ML models during a training session of the QA system.

14. The computer program product of claim 8, the operation further comprising:
generating, by applying the first ML model to a second candidate answer, a second confidence score value for the second candidate answer;
generating, by applying the second ML model to the second candidate answer, a measure of expected change to the second confidence score value based at least in part on supporting evidence features;
determining that the measure of expected change to the second confidence score value exceeds a second threshold; and
processing items of supporting evidence for the second candidate answer.

15. The computer program product of claim 14, wherein the second ML model specifies: (i) a weighted coefficient value for processing items of supporting evidence for the first candidate answer, and (ii) a plurality of supporting evidence feature score values, wherein each supporting evidence feature score value of the plurality of supporting evidence feature score values was observed during a training session of the QA system using supporting evidence processing for each of a plurality of candidate answers generated during the training session.

16. The computer program product of claim 15, wherein the measure of expected change is generated by computing a product of the weighted coefficient value and a first one of: (i) an average of the plurality of supporting evidence feature score values in the second model, (ii) a maximum value of the plurality of supporting evidence feature score values, and (iii) a selected one of the plurality of supporting evidence feature score values that is greater than a threshold percentage of the plurality of supporting evidence feature score values, wherein value corresponding to the expected change to the first confidence score value is determined by computing a product of the weighted coefficient value and a second one of: (i) the average of the plurality of supporting evidence feature score values in the second machine learning model, (ii) the maximum value of the plurality of supporting evidence feature score values, and (iii) the selected one of the plurality of supporting evidence feature score values that is greater than the threshold percentage of the plurality of supporting evidence feature score values.

17. The computer program product of claim 16, wherein the first threshold comprises one of: (i) a difference between the confidence score value of the second candidate answer and the first confidence score value of the first candidate answer, (ii) a difference between a confidence score threshold for a first confidence tier of a plurality of confidence tiers and the first confidence score value, and (iii) a difference between the first confidence score value and a minimum confidence score value, wherein the minimum confidence score value is associated with a minimum confidence tier of the plurality of confidence tiers.

18. The computer program product of claim 17, wherein the second threshold comprises a difference between the confidence score threshold for a second confidence tier of the plurality of confidence tiers and the second confidence score value.

* * * * *